United States Patent [19]
Brenner et al.

[11] Patent Number: 5,724,745
[45] Date of Patent: Mar. 10, 1998

[54] METHOD AND MANUALLY GUIDE COORDINATE MEASURING APPARATUS FOR MEASURING A WORKPIECE

[75] Inventors: Kurt Brenner, Satteldorf; Karl Seitz, Oberkochen; Klaus Herzog, Aalen; Werner Lotze, Dresden, all of Germany

[73] Assignee: Carl-Zeiss-Stiftung, Heidenheim/Brenz, Germany

[21] Appl. No.: 533,274

[22] Filed: Sep. 25, 1995

[30] Foreign Application Priority Data

Sep. 23, 1994 [DE] Germany .................. 44 33 917.8

[51] Int. Cl.⁶ .................................................. G01B 7/004
[52] U.S. Cl. .................... 33/503; 33/1 M; 33/561
[58] Field of Search .................... 33/503, 1 M, 1 PT, 33/1 R, 556, 558, 559, 561

[56] References Cited

U.S. PATENT DOCUMENTS

| | | | |
|---|---|---|---|
| 4,593,470 | 6/1986 | Davies | 33/1 PT |
| 4,769,763 | 9/1988 | Trieb et al. . | |
| 4,777,818 | 10/1988 | McMurtry | 33/503 |
| 4,805,314 | 2/1989 | Hayashi et al. | 33/1 M |
| 4,901,256 | 2/1990 | McMurtry et al. | 33/503 |
| 4,961,267 | 10/1990 | Herzog | 33/1 PT |
| 5,083,379 | 1/1992 | Enderle et al. | 33/559 |
| 5,088,208 | 2/1992 | Wells et al. | 33/559 |
| 5,212,873 | 5/1993 | McMurtry | 33/558 |
| 5,334,918 | 8/1994 | McMurtry et al. . | |
| 5,396,712 | 3/1995 | Herzog | 33/503 |
| 5,471,406 | 11/1995 | Breyer et al. | 33/503 |

FOREIGN PATENT DOCUMENTS

| | | |
|---|---|---|
| 0443968 | 8/1991 | European Pat. Off. . |
| 0450113 | 10/1991 | European Pat. Off. . |
| 1804253 | 6/1970 | Germany . |
| 2166266 | 4/1986 | United Kingdom . |
| 2229296 | 9/1990 | United Kingdom . |

*Primary Examiner*—Christopher W. Fulton
*Attorney, Agent, or Firm*—Walter Ottesen

[57] ABSTRACT

The invention is directed to a method for manually measuring a workpiece with a manually guided coordinate measuring apparatus. The apparatus includes a carrier for a probe which, in turn, carries a probe ball 12 on a deflectable probe pin 11. The carrier is movably journalled in several spatial directions. The probe ball 12 is brought into contact with the geometric element of the workpiece 30' to be measured and is guided therealong in continuous contact therewith. Signals ($\phi$, $\psi$, z) of coordinate measuring devices are generated with the movement of the probe. Signals (u, v, w) of a transducer of the probe are generated with a deflection of the probe pin 11. Control signals (80 to 84) are generated from the first signals and/or the second signals and these control signals characterize the start and the end of the measuring operation on the geometric element and the validity of the coordinate measurement values (X, Y, Z).

29 Claims, 8 Drawing Sheets

METHOD AND MANUALLY GUIDE COORDINATE MEASURING APPARATUS FOR MEASURING A WORKPIECE

BACKGROUND OF THE INVENTION

Manually guided coordinate measuring apparatus have up until now been equipped almost exclusively with so-called switching probe heads. This applies especially when relatively precise measuring results are required. The measuring procedure takes place in that the measuring arm of the coordinate measuring apparatus having the switching probe head attached thereto is moved toward the workpiece by the operator until the resiliently journalled probe with its probe ball touches the surface of the workpiece. In this first contact, a switching signal from a sensitive sensor is transmitted to the control circuit of the coordinate measuring apparatus. This switching signal serves to store the coordinate measurement value supplied by the coordinate measuring devices, that is, the scales. In the same manner, the next measuring point is recorded and the form or tolerance of the workpiece is determined by the evaluating computer of the coordinate measuring apparatus from the sum of the sequentially point-contacted locations on the workpiece.

The linear measurement of workpieces, performed by quasi-continuous recordings of measurement points on a surface of a workpiece with the aid of a so-called measuring probe head during scanning operation, was, up until now, not possible for various reasons with manually guided coordinate measuring apparatus. On the one hand, the measuring range in which the few known measuring probes output a signal proportional to the probe deviation is only very narrow and it is difficult or impossible to so move the relatively high inertial masses of a coordinate measuring apparatus by hand that the probe glides along the workpiece surface within the pregiven narrow limits of the probe deviation. Furthermore, because of the manual guidance, various forces and torques are applied to the measuring arm of the coordinate measuring apparatus. In this way, the guiding parts of the coordinate measuring apparatus deform to such an extent that precise measurements are precluded. This applies to an even greater extent to the measurement of workpieces with hand-guided machines and simple rigid probes as they were often used during the beginning of coordinate measuring technology.

For this reason, CNC-controlled coordinate measuring apparatus which are motor driven in all three axes, operate today in the quasi-continuous scanning mode. Corresponding scanning methods are disclosed, for example, in U.S. Pat. Nos. 4,769,763 and 5,334,918 as well as in U.S. Pat. No. 5,396,712.

The methods operate very slowly if unknown workpieces are measured pursuant to CNC-controlled scanning methods. The reason for this is that the control computer must continuously derive the further advance of the scanning operation from the path which has already been traversed.

U.S. Pat. No. 5,396,712 discloses an easily guided coordinate measuring apparatus having a relatively low mass of the guided parts with which line traces on the workpiece can be recorded while utilizing manual guidance. However, here too the problem occurs that the apparatus deforms under the forces applied by the operator so that the measuring results become imprecise. Furthermore, the recording of measurement points is difficult insofar as the start and the end of a measuring operation must be transmitted by the operator to the control unit of the apparatus. The actuation of corresponding signal devices, however, disturbs the delicately sensitive scanning of the surface of the workpiece.

SUMMARY OF THE INVENTION

It is an object of the invention to provide a method with which measurements of high accuracy can be carried out simply and rapidly with a manually guided coordinate measuring apparatus on the surface of a workpiece. It is also an object of the invention to provide a manually guided coordinate measuring apparatus especially suitable for this method.

The method of the invention is for measuring a geometric element of a workpiece with a manually guided coordinate measuring apparatus. The apparatus includes: a probe, a supporting mechanism for the probe to permit movement of the probe in several spatial directions, the probe having a probe pin having a probe element such as a probe ball thereon, a first plurality of sensors for detecting the respective movements in the spatial directions for generating movement signals ($\phi$, $\psi$, z) indicative of the movements; and, a plurality of sensing devices for detecting deflections of the probe pin relative to the supporting mechanism and for generating deflection signals (u, v, w) indicative of the deflections.

The method of the invention includes the steps of: bringing the probe element into contact with the geometric element; and, processing the movement signals ($\phi$, $\psi$, z) and/or the deflection signals (u, v, w) to generate control signals which characterize the start and end of a measurement operation on the geometric element of the workpiece and/or the validity of the coordinate measured values (X, Y, Z).

The coordinate measuring apparatus of the invention is for measuring a workpiece. The apparatus includes: a supporting mechanism to permit the movement thereof in three spatial directions; a plurality of sensors for detecting the respective movements in the spatial directions and for generating movement signals ($\phi$, $\psi$, z) indicative of the movements; a probe pin mounted on the supporting mechanism and being deflectable in at least two deflection directions; a plurality of sensing devices for detecting the deflections of the probe pin and for generating deflection signals (u, v, w) indicative of the deflections; an arrangement for processing the movement signals ($\phi$, $\psi$, z) and/or the deflection signals (u, v, w) to generate control signals characterizing start and end of a measurement operation on the workpiece; and, a memory coupled to the arrangement for storing coordinate measured values corresponding to the movement signals ($\phi$, $\psi$, z) and the deflection signals (u, v, w).

The invention starts with a coordinate measuring apparatus which includes a probe pin which can be deflected in at least two directions relative to a movable carrier. The probe pin supports a probe body which, as a rule, is a probe ball. The probe ball makes contact with the geometric element of the workpiece, which is to be measured, and is moved along this element. Control signals are derived from the signals of the coordinate measuring devices generated by the movement of the carrier and/or from signals of measurement-value transducers of the probe which are generated by the deflection of the probe pin. The control signals characterize the start and the end of a measuring operation as well as the validity of the coordinate measurement values.

The control of the coordinate measuring apparatus automatically detects the start and the end of the measurement. For this reason, the operator can concentrate on the scanning of the particular geometric element of the workpiece and no longer has to signal the start and end of a measurement. At the same time, it is ensured that the measurement result is not made incorrect by invalid measurement values which, for example, are obtained when the probe ball loses contact with the surface of the workpiece or when an excessive pressure is applied to the surface of the workpiece.

For the reasons advanced above, workpieces can be measured manually very rapidly and with high precision with the method according to the invention.

In many cases, the signals generated by the deflection of the probe pin are adequate in order to generate the above-mentioned control signals because the deflection of the probe pin is proportional to the measuring forces in many probes. Notwithstanding the foregoing, it can be purposeful to evaluate the signal of a sensor measuring the actuating force of the manual guidance and, in addition, to apply this signal for deriving the control signals in order to signal the start and end of the measurement; whereas, the signals derived from the probe deflection are applied to characterize the validity of the coordinate measurement values.

It is especially advantageous when the valid coordinate measurement values generated between the start and end of the measuring operation and the measurement values of the probe deflection corresponding thereto are stored in a memory. From these stored measurement values, the form of the geometric element which has been scanned can be automatically detected by means of a suitable evaluation program in the manner of an expert system. That is, a detection is made as to whether the scanned line defines a circle, lies on a planar surface, defines a cylindrical jacket, a rectangle or an ellipse. When accurate, the operator can then simply confirm the geometric element displayed at the end of the measuring operation and receives its dimensions, deviations, tolerances and the like displayed or printed out.

In a somewhat modified form, this method can be utilized in combination with so-called switching probes. These switching probes do not emit an analog signal, which is proportional to the deflection of the probe; instead, these switching probes only signal the time point of the contact of the workpiece with the probe. In this case, it can be adequate to determine the form of the geometric element (measured at points) only from the contact points and, if necessary, by including the stored coordinates for the path passed through by the probe between the measurement points.

The coordinate measuring apparatus especially suitable for carrying out the method of the invention includes a device for generating control signals from the signals of the coordinate measuring devices which are generated from the movement of the carrier of the probe, and/or from the signals of the measurement-value transducer of the probe generated by the deflection of the probe pin. The device for generating the control signals is coupled to a memory for storing generated coordinate measurement values including the corresponding probe deflections. Furthermore, it is advantageous when the probe is provided with an operating handle which is decoupled with respect to force from the probe pin or from the measurement arm carrying the probe pin with respect to several degrees of freedom of movement. The operating handle ensures that the operating forces are introduced into the measuring apparatus in the direction of guides and that no forces, torques or the like act upon the guides of the coordinate measuring apparatus.

It is especially advantageous for the operation by an operator and the generation of valid measured values when the coordinate measuring apparatus has a device for feeding back a visual or acoustic signal. This visual or acoustic signal indicates the validity of the coordinate measurement values and/or when predetermined limit values of the probe deflection are exceeded. This makes it possible for the operator to travel along the workpiece surface with a constant actuating force in that the operator is, in a manner of speaking, connected into the power control loop of the coordinate measuring apparatus.

With respect to the smooth running and low mass guidance parts, it is advantageous when the probe of the coordinate measuring apparatus is articulately connected to a carrier adjustable in elevation via pivot pins arranged one behind the other. Accordingly, the coordinate measuring apparatus has a configuration similar to the configuration described in U.S. Pat. No. 5,396,712. The articulated probe can, fox example, be deflectively journalled perpendicular to its shaft direction by means of a cardanic joint configured as a thin material section as described in German published patent application 1,804,253.

BRIEF DESCRIPTION OF THE DRAWINGS

The invention will now be described with reference to the drawings wherein:

FIG. 9b is a perspective view of the assembled operating handle of FIG. 9a;

DESCRIPTION OF THE PREFERRED EMBODIMENTS OF THE INVENTION

Figure 1:
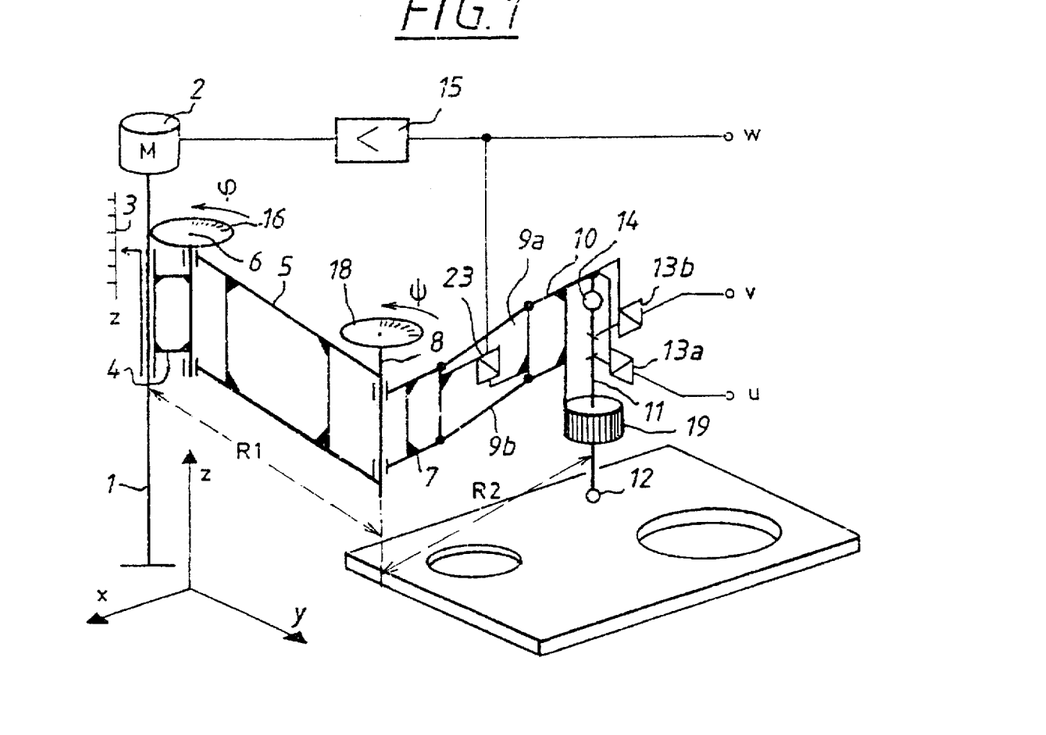
FIG. 1 shows a kinematic schematic of a coordinate measuring apparatus according to the invention having two parallel pivot pins.

The coordinate measuring apparatus shown in FIG. 1 includes a column 1 configured as a vertical z-guide on which a carrier or slide 4 is displaceably journalled with the aid of a drive 2. The vertical z-position can be photoelectrically read out via a scale transducer system 3.

The pivot pin 6 is attached to the carrier 4 and the first linkage arm 5 can be pivoted about the pivot pin 6 in the plane (x, y). The pivot angle is indicated by an angular measuring system 16 on the pivot pin 6. The angular measuring system 16 can likewise be read out photoelectrically.

A second pivot pin 8 parallel to the vertical pivot pin 6 is attached to the first linkage arm 5. A second linkage arm 7 is pivotally journalled on this pivot pin 8. An angular measuring system 18 in combination with a photoelectric scanning system (not shown) functions to detect the rotational movement of this second pivot pin 8.

The second linkage arm 7 simultaneously defines the carrier for a probe 10 which is linked to the carrier 4 via a spring parallelogram having the two articulated legs (9a, 9b). The probe 10 is movable vertically via the articulated legs (9a, 9b) of the spring parallelogram. The displacement (w) of the spring parallelogram is detected via a measuring system 23 and is transmitted via an amplifier 15 to the drive 2 which corrects larger deflections of the parallelogram by readjusting the carrier 4.

The probe pin 11 is deflectable in the plane (x, y) via a spring cardanic joint 14. The extent of the deflection is detected via two measuring systems (13a, 13b) mounted perpendicular to each other. The position of the probe ball 12 in the x/y plane is defined by the angle measurement signals φ and ψ of the angular measuring systems 16 and 18, respectively, in combination with the lengths R1 and R2 of the two linkage arms 5 and 7 in accordance with the following equations which are easily derived from FIG. 1:

$$X = R1 \cdot \cos \phi + R2 \cdot \cos (\phi + \psi)$$

$$Y = R1 \cdot \sin \phi + R2 \cdot \sin (\phi + \psi)$$

wherein R2 and ψ are also dependent on the deflection (u, v, w) of the probe pin 11.

Figure 2:
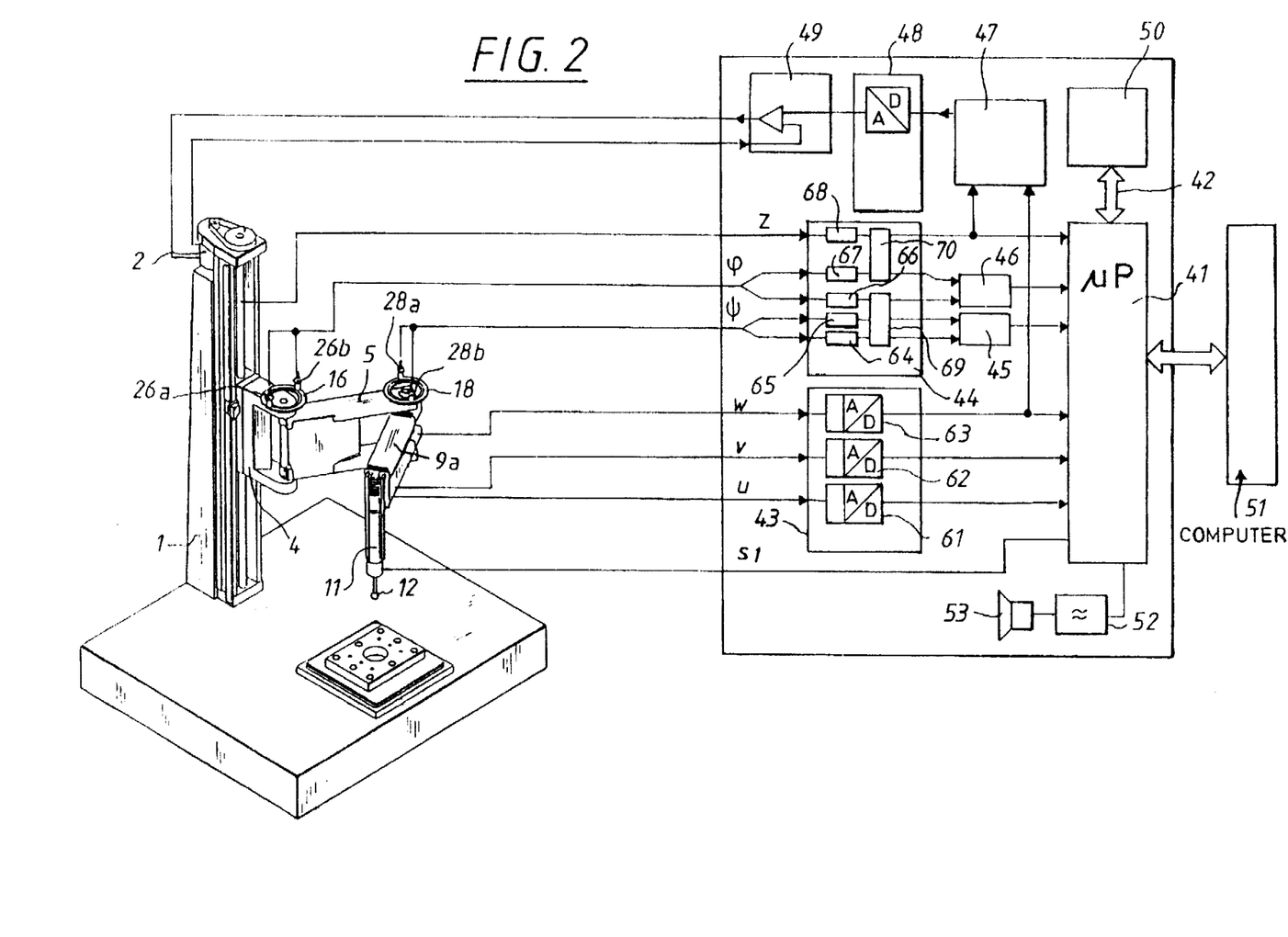
FIG. 2 is a perspective view of the apparatus of FIG. 1 supplemented with a block circuit diagram of the evaluation and control electronic circuits connected thereto.

As shown in the block circuit diagram of FIG. 2, the signal outputs (u, v, w) of the three measuring systems (13a, 13b and 23) are supplied to a function assembly group 43 having, for example, respective carrier-frequency measuring amplifiers (61, 62 and 63) and respective analog/digital converters connected downstream thereof. The measuring systems (13a, 13b and 23) are inductive measuring systems which operate pursuant to the carrier-frequency process. The digitalized measurement values of the probe-pin deflection are applied to the data inputs of a rapid microprocessor 41. The microprocessor 41 likewise receives the measurement values of the coordinate measuring devices, that is, of the scale/transducer system 3 which measures the z-displacement and of the two angle measuring systems (16 and 18). The measurement values of the angle measuring systems (16, 18) are read out via respective sets of read heads (26a/26b and 28a/28b) to avoid centering errors. The read heads of each set are mounted on respective sides of the pivot pins. The pairs of angle measurement signals (φ and ψ), that is, the sine/cosine signals of the incremental angular measuring systems are interpolated 80 times in interpolators (66 to 68) and counted in the counters (69 and 70). The interpolators (65 to 68) and the counters (69, 70) are assembled in the function assembly group identified by reference numeral 44 (path measurement). Two summing circuits (45 and 46) form the mean value of the angular measurement values of transducer pairs (26a/26b and 28a/28b). The actual digital angular measurement signals φ and ψ obtained therefrom as well as the measurement value (z) are supplied to three digital inputs of the microprocessor 41.

At the same time, the measurement values of the probe deflection (w) and the z-measurement value are supplied to a drive control circuit 47. This circuit forms a digital control signal which is supplied to a servo amplifier 49 via a digital/analog converter 48. The servo amplifier 49 is furthermore connected to the tachogenerator of the drive 2. The drive control circuit 47 ensures that the drive 2 always adjusts the carrier 4 of the articulate legs (9a, 9b) of the apparatus to the deflection of the spring parallelogram in order to compensate for the deflection (w).

The microprocessor 41 is connected to an evaluating computer 51 (a conventional PC) via a data bus. A memory component 50 is furthermore assigned to the microprocessor. The measurement signals (u, v, w and φ, ψ, z) obtained from the microprocessor can be stored in the memory component 50 as will be described below.

The microprocessor 41 is furthermore coupled to a frequency generator 52 and a speaker 53. One of the tasks of the microprocessor 41 is to monitor the probe pin deflection (u, v, w) via a corresponding evaluation program in its firmware and to generate an acoustic signal having a frequency dependent upon whether one of the signals (u, v or w) exceeds a specific maximum permissible amount L2 or whether all signals (u, v and w) lie below a lower threshold L1 for the probe deflection. In both cases, an acoustic signal is outputted in order to tell the operator that the operator has left the permissible range for recording valid measurement values.

Before a detailed explanation is provided as to making measurements with the apparatus described in FIGS. 1 and 2, the probe of the apparatus will first be explained with respect to FIGS. 6 and 7. The two embodiments of FIGS. 6 and 7 are distinguished only by the operating handle mounted on the probe or the probe pin.

Figure 6:
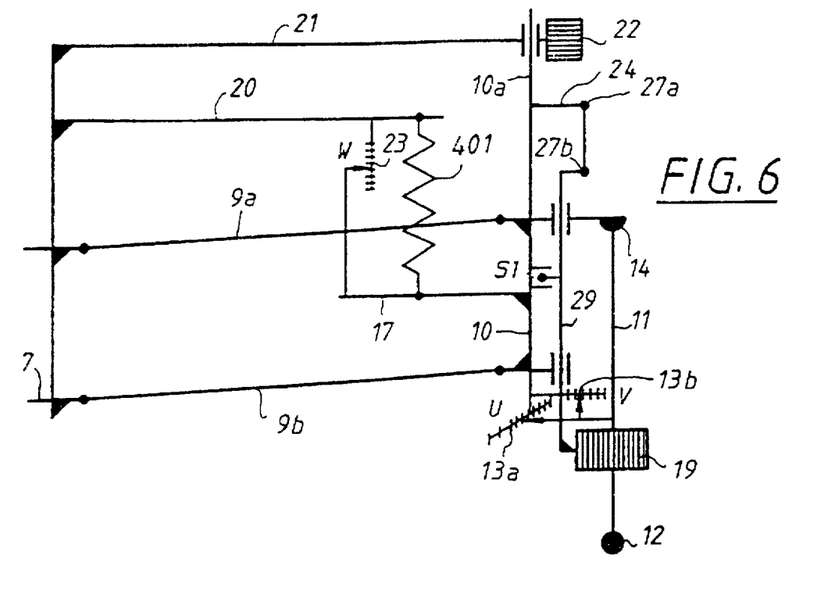
FIG. 6 is a kinematic schematic of a first embodiment of a probe suitable for the apparatus of FIG. 1.
Figure 7:
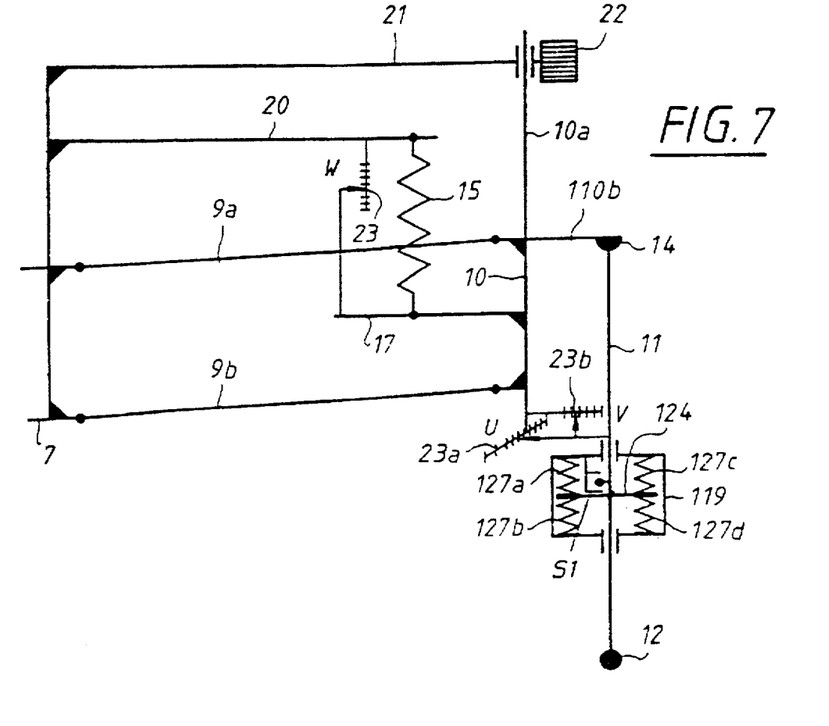
FIG. 7 is a kinematic schematic of a second embodiment of a probe suitable for the apparatus of FIG. 1.

The probe 10 described in FIG. 6 is articulatedly connected to the linkage arm 7 of the apparatus of FIG. 1 via a spring parallelogram having two articulated legs (9a and 9b). A spring 401 between a rod 20 connected to the linkage arm 7 and a rod 17 connected to the probe 10 acts to compensate the weight of the probe 10 and holds the probe in the zero position of the measuring system 23. The vertical deflection (w) of the probe is measured by the inductive system.

An extension piece 10a of the probe 10 can be coupled by means of a clamping device 22 to the end of a bending beam 21 connected to the linkage arm 7. By clamping in the vertical, a profile can be contact scanned on the workpiece at a pregiven elevation as will be described below.

The probe pin 11 having the probe ball 12 is also connected to the probe 10. The probe pin 11 is held so as to be deflectable in the horizontal plane (x, y) via a cardanic spring joint 14 formed from thin material. The two inductive measuring systems (13a, 13b) serve to detect the probe deflection in the plane perpendicular to the vertical.

The probe 10 is moved by the operator by means of a handle 19. The handle is supported on the probe 10 via a leaf spring 24 so as to yield in the vertical direction. Two linkages (27a and 27b) are built into the connecting part 29 between the leaf spring 24 and the handle 19. The linkages decouple the handle 19 with respect to bending forces from the probe 10. The handle 19 is configured as an annular sleeve which surrounds the probe pin 11. A switch S1 is provided between the probe and the connecting part 29 of the handle 19. Via the switch S1, a signal can be provided that the operating force in the vertical has exceeded a specific threshold L0.

The handle 119 in the embodiment of the probe of FIG. 7 is likewise decoupled from the probe 10 with respect to bending forces. Those components in FIG. 7 which correspond to components in FIG. 6 are identified by the same reference numerals. The handle 119 is here journalled directly on the probe pin 11. This is done by means of a ring-shaped plate 124 on the probe pin 11. The plate 124 is held in place on both sides on several locations by springs (127a to 127d) in the interior of the handle 119 configured as an annular cylindrical sleeve.

Here too, a switch S1 is provided which signals the operating force between the handle 119 and the probe pin 11 in the vertical direction or signals when a minimal force L0 is exceeded.

An operator proceeds as described below to measure different geometric elements with the apparatus described above.

Figure 3A:
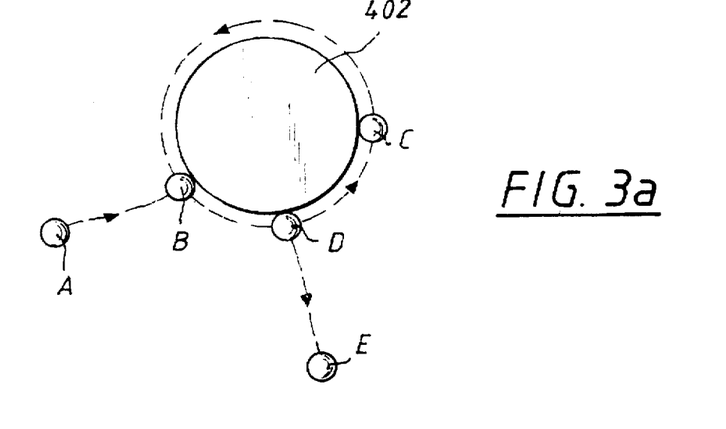
FIG. 3a is a schematic showing a manual contact scanning on the surface of a shaft.

If for example, a bore lying in the x/y plane or the shaft 31 shown in FIG. 3a is to be contact scanned, then the deflection (u, v) of the probe pin 11 is detected by the measuring systems (13a, 13b). At the same time, the forces developed thereby are obtained simultaneously via the spring characteristic line of the spring cardanic joint 14. In this case, there is no force present in the vertical direction because the servo control, which is explained with respect to FIG. 2, compensates each deflection (w) indicated by the measuring system 23 by a corresponding readjustment of the carrier 4.

If the bore or shaft 31 is to be contact scanned at a specific elevation, then the deflection of the articulated legs (9a, 9b) of spring parallelogram should first be blocked via the clamping device 22 and the servo control of the carrier 4 should be switched off. If an actuating force is now also applied in the vertical, then this generates a bending of the bending beam 21 which is detected by measuring system 23. The force in the vertical z-direction, which acts on the linkage arm 7 of the probe 10, is known via the spring characteristic line of the rod 20. In this way, all forces or torques which result from the contact of the probe ball 12 on the workpiece are known and can be used to correct the bending of the probe pin 11 or the deformation of the linkage arm as described in U.S. patent application Ser. No. 08/533,273 filed Sep. 25, 1995, and incorporated herein by reference. The coordinate measuring apparatus permits the geometric element to be measured to be contact scanned in the scanning method linearly with high accuracy.

Figure 3B:
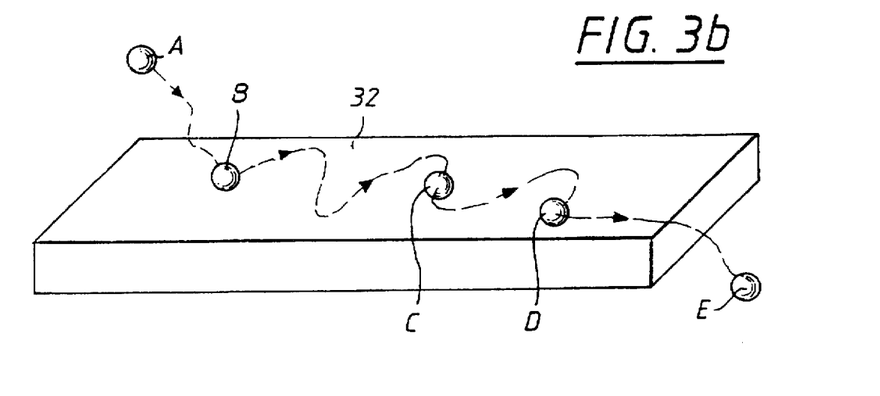
FIG. 3b is a schematic showing a manual contact scanning of a planar surface.

If a surface lying in the x/y plane, such as the surface 32 of FIG. 3b, is contacted, then the contact force in the z-direction with a displacement of the probe pin 11 on the surface 32 would effect a deflection of the measuring systems (23a and 23b) only via the friction force between the probe ball 12 and the surface 32. The force acting between the probe pin 11 and the probe 10 in the z-direction is, in contrast, not known. This circumstance can lead to uncertainties in the case of low force and low friction coefficients. If one would scan, for example, the bore wall in a step bore and the shoulder surface simultaneously, then, in this case, it could not be detected if contact to the probe ball 12 was only at the bore inner wall but also on the shoulder surface. This is then the case when a specific force is exceeded in the vertical z-direction which is signaled by a closing of the switch S1.

Figure 3C:
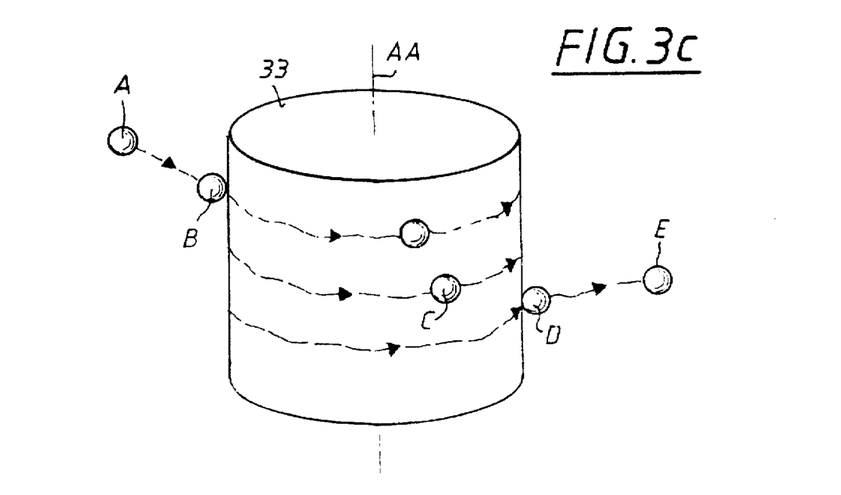
FIG. 3c is a schematic showing a manual contact scanning of a surface of a cylinder.

If the axial position of the cylinder 33 shown in FIG. 3c is to be determined, then the cylinder surface is scanned in different elevations, for example, spirally; whereas, the clamping device 22 is deactivated and the drive 2 causes the carrier 4 of the linkage arm to follow the manually guided probe pin 11.

Figure 5:
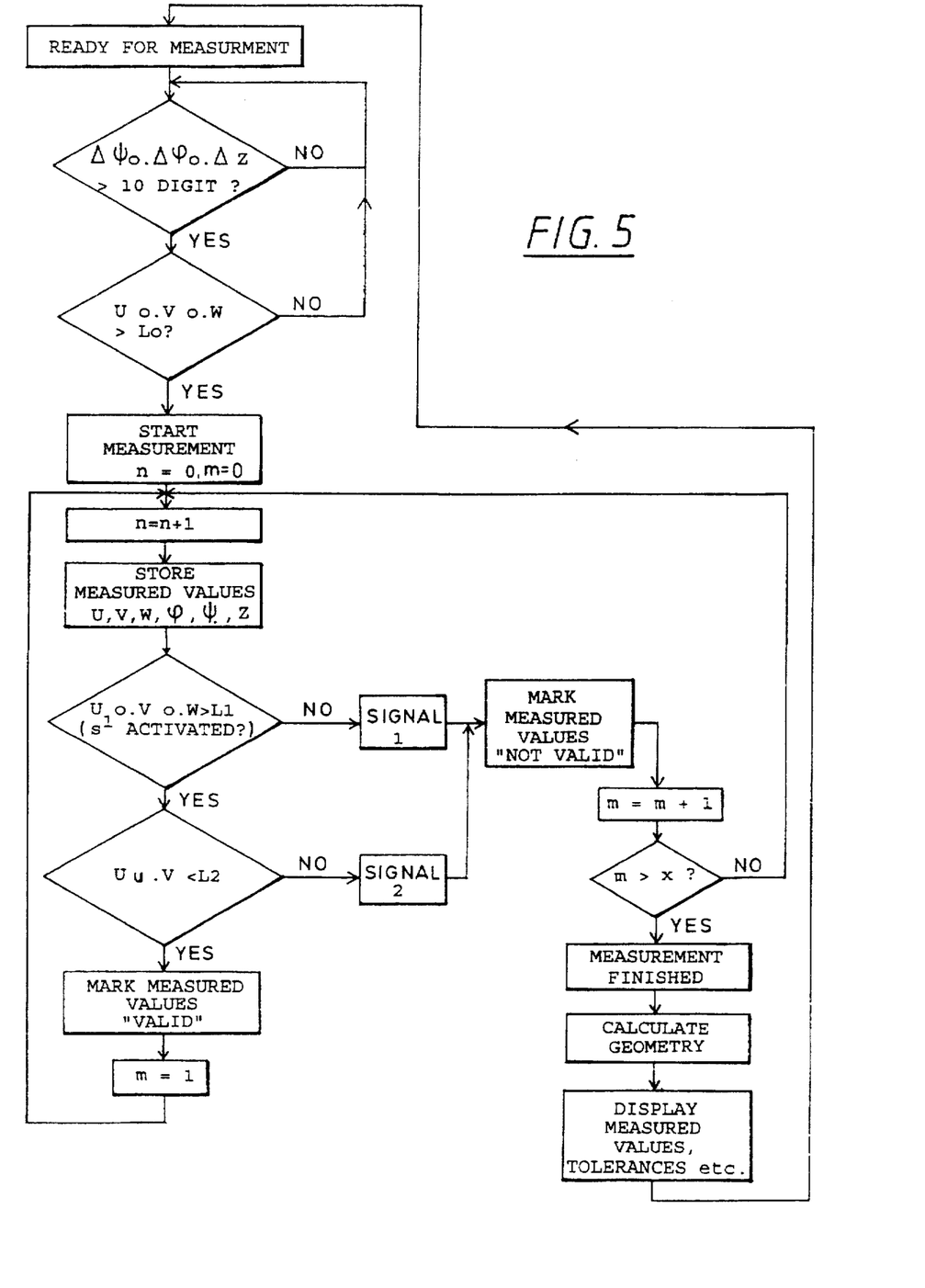
FIG. 5 is a flowchart of a measuring program suitable for the apparatus of FIG. 1.

The measurement with the described apparatus is especially operator friendly when the start and the end of a measuring operation is automatically detected as, for example, with the method to be described in the following. In addition, the measurement with the apparatus described herein is especially operator friendly when only measuring points are evaluated which have been detected with a contact force lying within specific limits (L1 and L2). This guarantees, on the one hand, that the probe ball was in contact with the workpiece surface during the measurement and, on the other hand, that the permissible range for a reliable correction was not exceeded. This automatic method can be realized by appropriate programming of the firmware of the microprocessor 41 (see FIG. 2), for example, in the manner shown in the flowchart of FIG. 5.

Thereafter, the measuring apparatus is in operational readiness when, for example, the probe ball 12 is located without contact to the workpiece in the position A shown in FIGS. 3a to 3c somewhere in the measuring range of the apparatus. In this mode "measurement operational readiness", two criteria are continuously checked, namely, whether the linkage arm 7 of the probe was moved in any way and whether the occurrence of a measuring force (that is, contact with the workpiece) is signaled because of deflection of the measuring systems (u or v or w) above a minimum threshold L0. The first criterion is satisfied as soon as the probe ball is moved out of its rest position A and the second criterion is satisfied at that instant in which the probe ball, in position B, contacts the surface of the geometric elements (circle 402), (surface 32) or (cylinder 33) in FIGS. 3a, 3b or 3c, respectively. From this instant on, the coordinate measuring values $\phi$, $\psi$ and z, which define the movement of the linkage arm 7 in space, and the measured probe pin deflections (u, v and w) are stored simultaneously with high point density. Simultaneously, and for each measurement point (n), a check is made as to whether the contact force for any one of the deflection directions lies above a minimum threshold L1 and lies below an adjustable maximum threshold L2 for the deflections (u and v). Only when both conditions are satisfied, is the measurement value marked as valid and the next measurement value (n+1) is stored.

If one of the two above-mentioned conditions is not satisfied, then the corresponding measurement value is marked as invalid and the next measurement point is stored. At the same time, the number of sequential invalid measurement values (m) is counted and an inquiry is made as to whether this value (m) has exceeded a fixed upper limit (x). This is, for example, the case when one scans the geometric element to be measured (position D in FIGS. 3a, 3b and 3c) after which the probe ball leaves the geometric element. In this instant, the measuring force vanishes and all following points are marked as invalid and when the probe ball is moved away to position E, for example, two centimeters from the workpiece surface, then, for example, 200 invalid measurement points are sequentially recorded which signals the end of the measurement.

Figure 4:
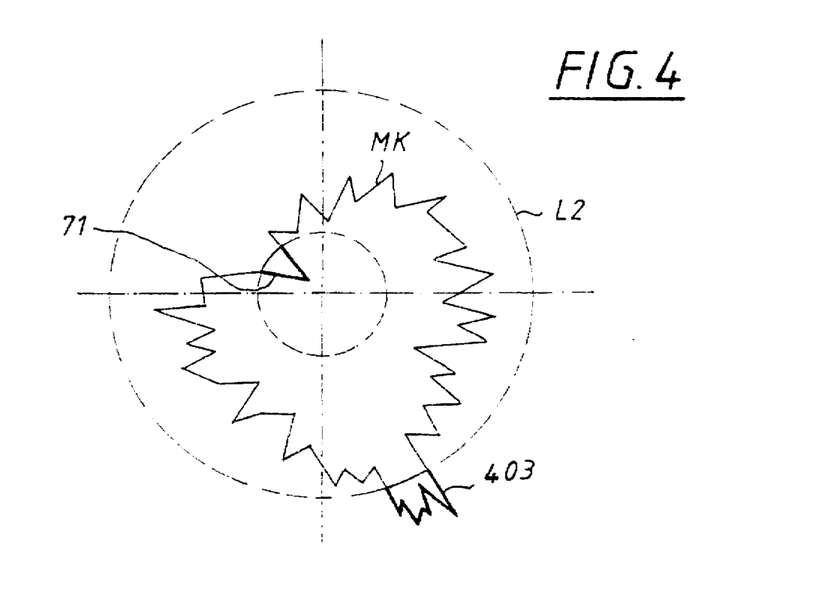
FIG. 4 is a polar coordinate diagram in which the measuring forces are shown which are applied when contact scanning a circularly-shaped geometric element.

When scanning the circularly-shaped geometric element of FIG. 3a, the trace results in the polar diagram of FIG. 4 for the measuring force MK. At positions 403 and 71, the probe pin deflection and therefore the measuring force MK has exceeded the permissible range delimited by the adjusted thresholds (L2 and L1). This exceeding and dropping below is displayed to the operator already during scanning of the surface of the workpiece by a high or low signal tone from the speaker 53 (see FIG. 2) whereupon the operator reduces or increases the pressure on the workplace. The corresponding measured values are marked as invalid and the program automatically computes from the remaining measured values a geometric element, in the example, a circle. This geometric element is offered to the operator on the monitor of the evaluating computer 51 as a measurement result and can be confirmed. If the operator confirms the suggested geometric element, then the measured values are printed out in the form of a measurement protocol subsequently in a manner known per se including the tolerances possibly pregiven and the like. The apparatus then is again in the mode of measurement readiness and can measure the proposed geometric element. If the operator does not confirm the next geometric element, then the operator is requested to select another element and selects, for example, a cylinder. In this case, the measurement result is not adequate to determine the position of the cylinder axis and the program requires the operator to scan the cylinder in a second elevation line and goes to the mode of measurement readiness.

Figure 8:
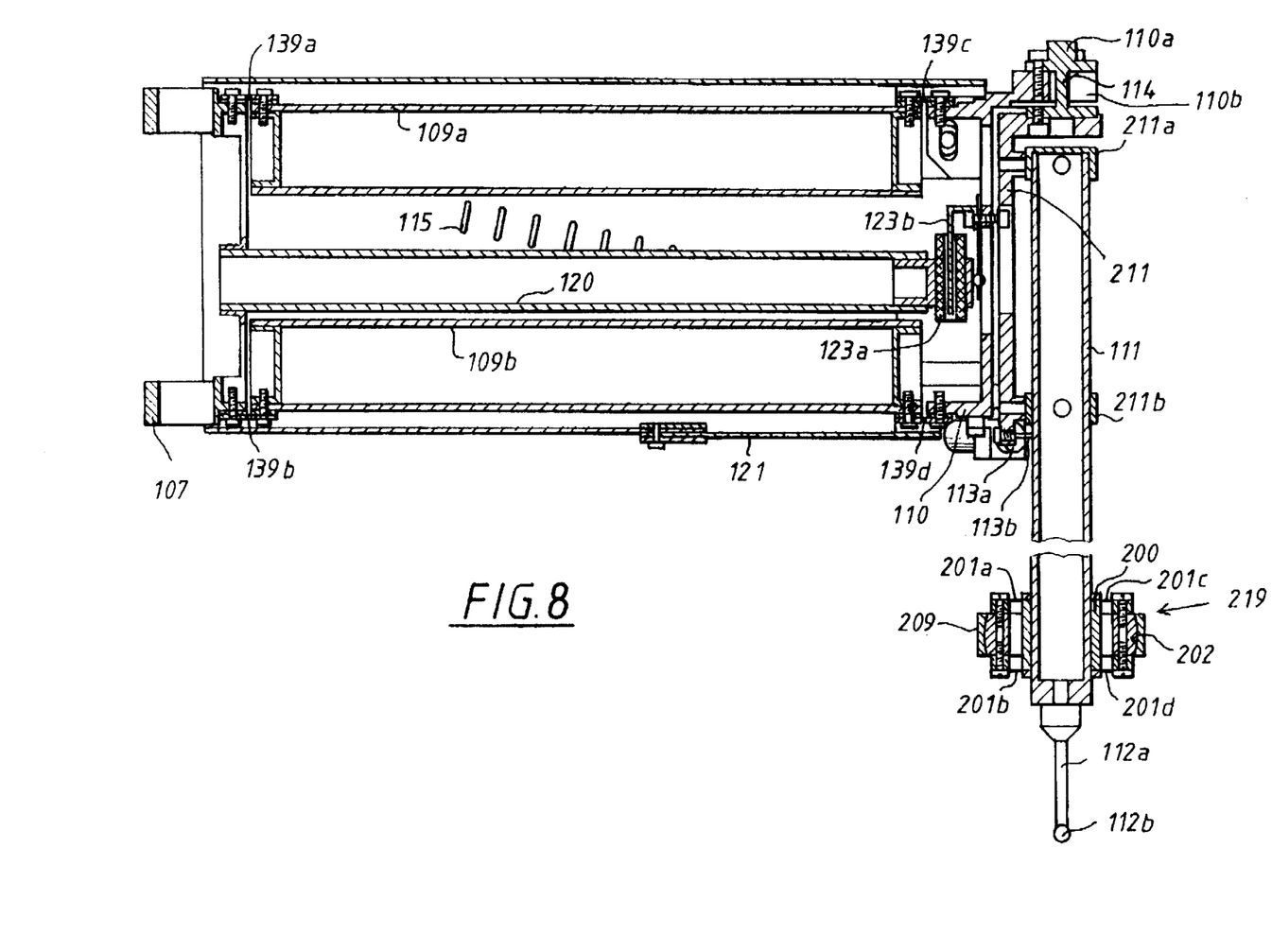
FIG. 8 is a structural schematic showing the configuration of the probe head for the apparatus of FIG. 1 in accordance with an especially advantageous embodiment.

The probe head of the measuring apparatus is shown in detail in the construction drawing of FIG. 8. The probe head permits an especially sensitive manual scanning of the workpieces to be measured while avoiding as far as possible forces and torques caused by the operator. In the schematic shown, reference numeral 107 identifies the holder with which the probe head is held on the second pivot pin 8. The spring parallelogram ensures the deflection of the probe head in the vertical z-direction. This spring parallelogram is defined by two tubes (109a and 109b) having a rectangular cross section. The ends of this parallelogram are connected to the holder 107 and the carrier 110 for the probe pin via leaf springs (139a, 139b, 139c and 139d) which are threadably fastened. A diagonally tensioned spring 115 operates for compensating load on the carrier 110. The core 123b of the inductive measurement system for the z-displacement is also attached to the carrier 110; whereas, the coil 123a is supported at the end of the tube 120 which is fixedly connected to the holder 107.

A pivot part 110a is secured with threaded fasteners to the upper end of the carrier 110. An annular slot 110b is machined into the pivot part 110a so that a location of thin material 114 is provided. This segment of thin material acts as an elastic cardanic joint for the probe 111 suspended therefrom. For accommodating the probe 111, a holding part 211 is placed on the disc-shaped lower part of the rotational part 110a. The holding part 211 is provided with two sleeves 211a and 211b in which the probe shaft 111 is seated. The actual probe pin 112a with the probe ball 112b is screwed into this probe shaft 111 at the lower end thereof.

Reference numerals 113a and 113b identify the coil and the core of one of the two measuring systems which measure the deflection of the probe shaft 111 about the location of thin material 114. The two measuring systems are attached with their axes at an angle of 45° referred to the plane of the drawing.

A handle 219 is placed about the probe shaft 111 and this handle has the following configuration: leaf springs (201a, 201b, 201c and 201d) project outwardly and are clamped to the sleeve 200 on the probe shaft 111 and a second external sleeve 202 is hooked into the leaf springs so as to yield in shaft direction. This second sleeve 202 has a spherical outer segment on which a ring 209 is seated. The inner side of the ring 209 is adapted to the radius of the spherical segment. The ring 209 can be rotated about the probe shaft and can be tilted toward the axis of the probe shaft. The ring 209 is the actual operating handle which is grasped by the operator when moving over the workpiece to be measured.

Figure 9A:
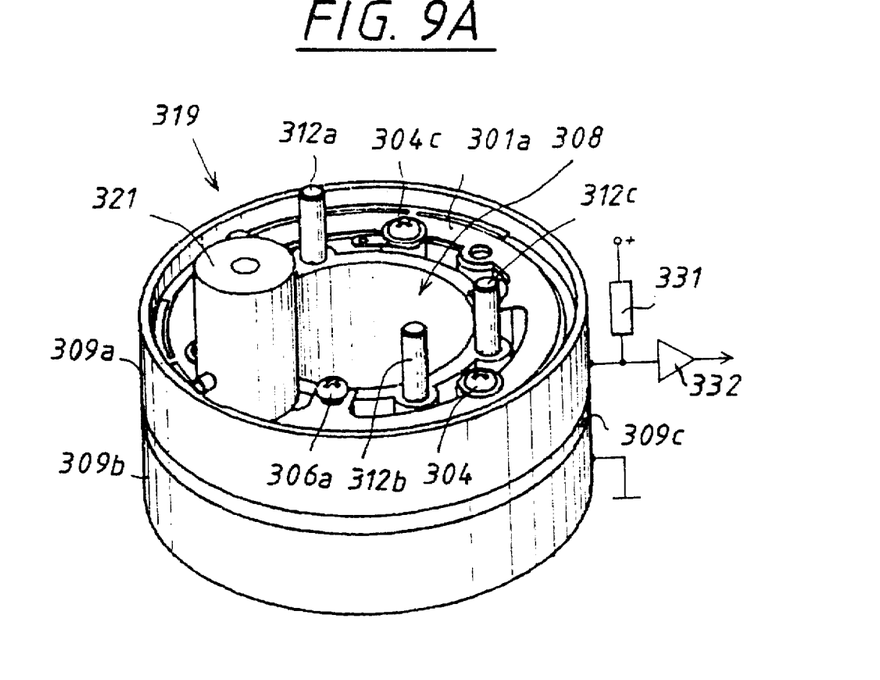
FIG. 9a is a perspective view of a partially assembled operating handle for a delicately-sensitive movement of the probe.
Figure 9B:
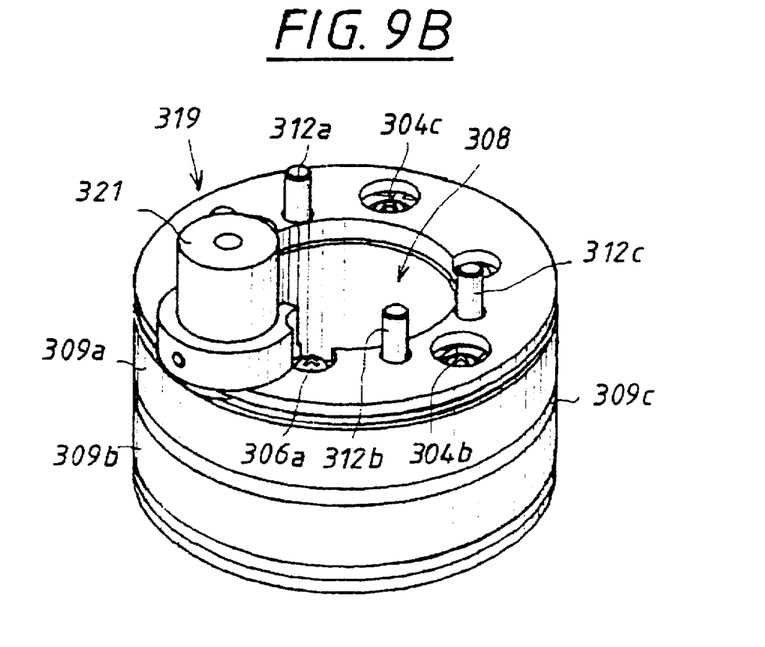
Figure 9C:
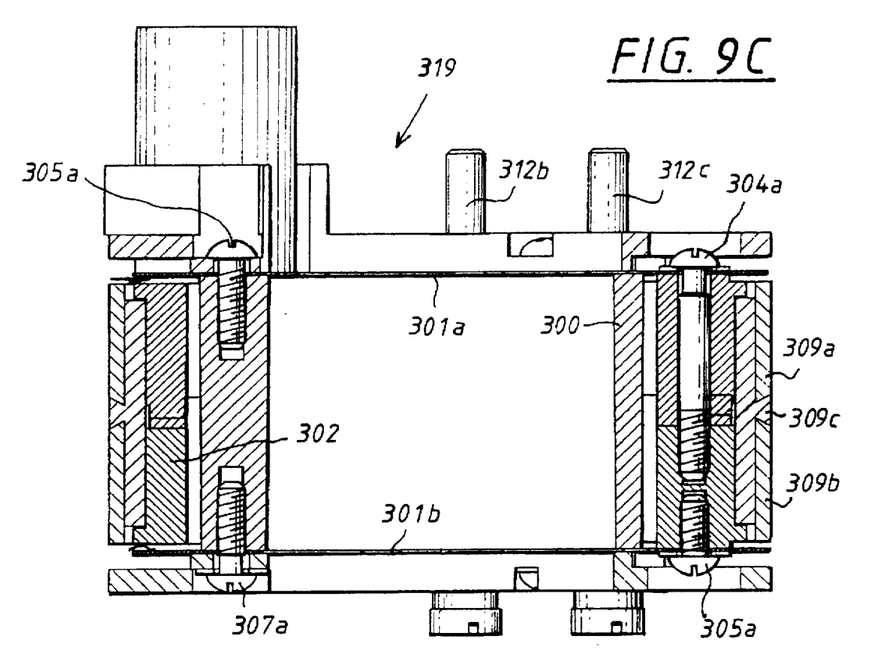
FIG. 9c is a section view taken through the handle of FIGS. 9a and 9b along a first cutting plane; and, FIG. 9d is a section view taken through the operating handle of FIGS. 9a and 9b along a second cutting plane.
Figure 9D:
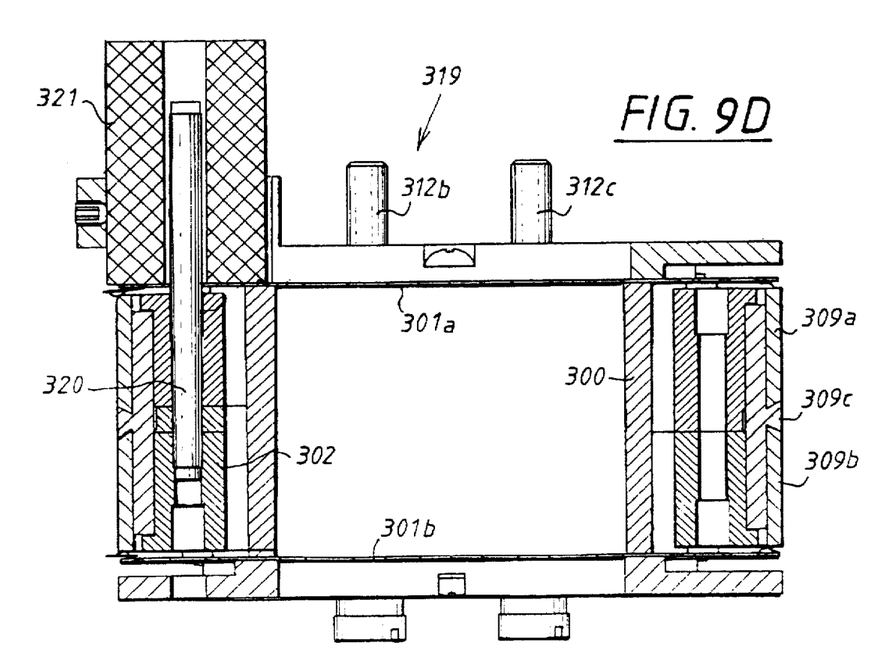

The operating handle 319 of FIGS. 9a to 9b is similar to the handle 19 shown in FIG. 6. The operating handle is not directly mounted on the deflectable probe pin 11 but is instead mounted on the support and is attached to the support via three threaded fasteners (312a, 312b, 312c). The handle is annular in shape and has an opening 308 through which the probe pin 11 can be introduced. In this case, the probe pin 11 is exchangeable. The opening 308 affords sufficient space for lateral deflective movements of the probe pin 11.

The attachment screws (312a, 312b, 312c) are seated in an annular inner sleeve 300. An annular membrane spring 301a is attached to the upper end of the sleeve 300 by means of three screws (306a, 306b and 306c). The second annular membrane spring 301b is attached to the lower end of the sleeve 300 via screws (307a, 307b, 307c). At three locations, which are each displaced by 60° with respect to the pins, the membrane spring 301a is attached via three further screws (304a, 304b, 304c) to a second annular sleeve 302 which surrounds the sleeve 300. The second membrane spring is likewise attached to the second annular sleeve 302 via three screws (305a, 305b, 305c). These last-mentioned screws are likewise located at positions spaced 60° with respect to the pins. The annular sleeve 302 is supported so as to yield in the direction of the longitudinal axis of the probe pin against the spring constant of the membrane springs (301a, 301b).

The sleeve 302 is configured of two parts and both parts are held together by the screws (304a, 304b, 304c). In the assembled condition, the sleeve 302 has a flat U-shaped slot formed in its outer periphery in which a ring (309a, 309b, 309c) is loosely seated. The ring (309a, 309b, 309c) can then be rotated about the sleeve 302. In this way, the handle 319 is again decoupled from torsion torque of the probe 10 on which it is attached.

The ring (309a, 309b, 309c) itself is made of three parts. The ring 309 comprises an inner plastic ring 309c which has a projection in the center of its outer periphery. The projection separates two metal rings (309a and 309b) of the same diameter from each other which are arranged one above the other in the direction of the longitudinal axis of the probe pin. The rings (309a, 309b) are configured as contacts of an electric touch sensor and, for this purpose, are connected to corresponding ones of membrane springs (301a, 301b) which are likewise mounted so as to be insulated from each other. The membrane springs (301a, 301b) are, in turn, connected to electric components (331, 332) of the touch switch. The electric components (331, 332) are shown in FIG. 9a. This touch switch functions to activate the coordinate measuring apparatus or individual ones of its functions when the operator grasps the handle 319. For example, in this way, the servo amplifier 49 can be activated fox the z-adjustment of the carrier 4 shown in FIG. 2. In this way, the z-adjustment is prevented from drifting away when the apparatus remains switched on for a long time but is not used.

Also, a further sensor is integrated into the handle 319. This sensor is an inductive measuring system comprising a coil 321 and a core 320. The coil 321 is connected to the inner sleeve 300 and the core 320 is attached to the outer sleeve 302. With the aid of this displacement measuring system, the force which an operator applies to the probe 10 in the z-direction can be measured via the spring constant of the membrane springs (301a, 301b). This is then important when the probe 10 is clamped with respect to the vertical deflecting movement by means of the parallelograms. Clamping can be achieved, for example, via the clamping device 22. The probe 10 is clamped when it is desired to contact scan cylindrical workpieces, for example, at a specific elevation. By means of the measurement of the force applied by the operator to the handle 319 in the z-direction, it is possible with the aid of the core and coil (320, 321) to determine the deformations of the apparatus caused by the operating force and to make computations from the measuring result. For this purpose, the operating force can likewise be detected during the entire measuring operation and stored in the same manner as the deflecting movements of the probe pin 11 with the aid of the measuring systems shown in FIG. 6.

It is understood that the foregoing description is that of the preferred embodiments of the invention and that various changes and modifications may be made thereto without departing from the spirit and scope of the invention as defined in the appended claims.

What is claimed is:

1. A method for measuring a geometric element of a workplace with a manually guided coordinate measuring apparatus including a probe, a supporting mechanism for the probe to permit movement of the probe in several spatial directions, the probe having a probe pin having a probe element such as a probe ball thereon, a first plurality of sensors for continuously measuring the respective movements in said spatial directions for generating movement signals ($\phi$, $\psi$, z) indicative of said movements throughout the measuring operation; a plurality of sensing devices for continuously measuring deflections of said probe pin relative to said supporting mechanism and for generating deflection signals (u, v, w) indicative of said deflections throughout the measuring operation;

the method comprising the steps of:

bringing said probe element into contact with said geometric element; and, processing at least one of said signals ($\phi$, $\psi$, z, u, v, w) to generate control signals which characterize the start and end of a measurement operation on the geometric element of the workpiece.

2. The method of claim 1, wherein an actuating force is applied to the probe; and, wherein the method comprises the steps of:

providing a sensor to measure said actuating force and supply a sensor signal; and, evaluating said sensor signal and applying the evaluation to generate said control signals.

3. The method of claim 2, wherein selected ones of said control signals characterize the validity of said coordinate measured values; said selected ones of said signals are said deflection signals (u, v, w).

4. The method of claim 3, wherein said force applied to said probe is a measuring force and the method further comprising:

setting limit values for said measuring force and for said deflections of said probe pin; and, assuming a drop below or an increase above respective ones of said limit values as a criterion for said validity of said coordinate measured values (X, Y, Z).

5. The method of claim 4, wherein an acoustic signal indicates when there is a drop below and an increase above corresponding ones of said limit values.

6. The method of claim 4, wherein the remaining ones of said control signals characterize said start and said end of a measurement operation; said probe pin defines a longitudinal axis and two of said deflection signals (u, v) are indicative of deflections of said probe pin transverse to said axis which exceed a specific threshold (L0); and, wherein the method comprises generating said remaining ones of said control signals by logically combining said movement signals ($\phi$, $\psi$, z) and said two deflection signals.

7. The method of claim 1, further comprising storing said movement signals ($\phi$, $\psi$, z) and said deflection signals (u, v, w) before, during and after a measuring operation.

8. The method of claim 7, further comprising determining and assigning measurement values to simple geometric elements including a circle, surface, cylinder, rectangle and ellipse from those valid coordinate measured values generated between the start and the end of a measurement operation and displaying said measurement values; and, displaying departures of the coordinate measured values from ideal contours of the geometric elements.

9. A manually guided coordinate measuring apparatus for measuring a workpiece in a measuring operation, the apparatus comprising:

a supporting mechanism to permit the movement thereof in three spatial directions;

a plurality of sensors for continuously measuring the respective movements in said spatial directions and for generating movement signals ($\phi$, $\psi$, z) indicative of said movements throughout the measuring operation;

a probe pin mounted on said supporting mechanism and being deflectable in at least two deflection directions;

a plurality of sensing devices for continuously measuring the deflections of said probe pin and for generating deflection signals (u, v, w) indicative of said deflections throughout the measuring operation;

an arrangement for processing at least one of said signals ($\phi$, $\psi$, z, u, v, w) to generate control signals characterizing start and end of a measurement operation on said workplace; and, a memory coupled to said arrangement for storing coordinate measured values obtained throughout said measuring operation and corresponding to said movement signals ($\phi$, $\psi$, z) and said deflection signals (u, v, w).

10. The coordinate measuring apparatus of claim 9, said supporting mechanism including a guide structure to facilitate a displacement of said support in the direction (w); and, a clamping device for clamping said support against displacement in said direction (w).

11. The coordinate measuring apparatus of claim 10, further comprising a device for feeding back a visual or acoustic signal which indicates the validity of the coordinate measurement values.

12. The coordinate measuring apparatus of claim 9, said arrangement including a data processing unit for determining and displaying simple geometric elements of workpieces from the stored coordinate measured values.

13. The ice measuring apparatus of claim 9, further comprising a base and a carrier mounted on said base so as to be movable in elevation; said supporting mechanism being mounted on said carrier for movement in elevation and including two successive pivot axes for facilitating an articulated movement of said mechanism; and, a motor for effecting the movement of said carrier in elevation relative to said base.

14. The coordinate measuring apparatus of claim 9, further comprising a base; a carrier mounted on said base so as to be movable in elevation; a drive for effecting the movement of said carrier in elevation; a support connected to said supporting mechanism and being provided to hold said probe pin; an operating handle mounted on said probe pin; and, one of said sensing devices being a sensing system operatively connected to said operating handle and including at least one sensor for supplying one of said deflection signals (w); and, circuit means interposed between said one sensor and said drive to permit said one deflecting signal (w) to operate on said drive.

15. The coordinate measuring apparatus of claim 9, further comprising means for automatically detecting simple geometric elements of a workpiece from said coordinate measured values stored in said memory.

16. The coordinate measuring apparatus of claim 9, further comprising a base; a carrier mounted on said base so as to be movable in elevation; a drive for effecting the movement of said carrier in elevation; a support connected to said supporting mechanism and being provided to hold said probe pin; an operating handle mounted on said support; and, one of said sensing devices being a sensing system operatively connected to said operating handle and including at least one sensor for supplying one of said deflection signals (w); and, circuit means interposed between said one sensor and said drive to permit said one deflecting signal (w) to operate on said drive.

17. A manually guided coordinate measuring apparatus for measuring a workpiece in a measuring operation, the apparatus comprising:

a supporting mechanism to permit the movement thereof in three spatial directions;

a plurality of sensors for continuously measuring the respective movements in said spatial directions and for generating movement signals ($\phi$, $\psi$, z) indicative of said movements throughout the measuring operation;

a probe pin mounted on said supporting mechanism and being deflectable in at least two deflection directions;

a plurality of sensing devices for continuously measuring the deflections of said probe pin and for generating deflection signals (u, v, w) indicative of said deflections throughout the measuring operation;

an arrangement for processing at least one of said movement and deflection signals ($\phi$, $\psi$, z, u, v, w) to generate control signals characterizing start and end of a measurement operation on said workpiece;

a memory coupled to said arrangement for storing coordinate measured values obtained throughout said measuring operation and corresponding to said movement signals ($\phi$, $\psi$, z) and said deflection signals (u, v, w); and,     a support connected to said supporting mechanism and being provided to hold said probe pin; an operating handle mounted on said probe pin; and, an interface between said probe pine, on the one hand, and said operating handle, on the other hand, for force decoupling said operating handle from said probe pin with respect to at least one degree of movement.

18. The coordinate measuring apparatus of claim 17, said operating handle being a sleeve; and, said interface being a flexible connection between said sleeve and said probe pin.

19. The coordinate measuring apparatus of claim 17, further comprising at least one sensor actuable when said operating handle is actuated.

20. The coordinate measuring apparatus of claim 19, said sensor being an electric switch which responds when the actuating force in the direction of said probe pin exceeds a predetermined limit value (L0); and, said electric switch being connected to said arrangement for generating said control signals.

21. The coordinate measuring apparatus of claim 19, said sensor being a measurement system for measuring the actuating force in the direction of said probe pin.

22. The coordinate measuring apparatus of claim 19, said sensor being a touch sensor for detecting a grasp of said operating handle by an operator to activate predetermined functions of said apparatus.

23. The coordinate measuring apparatus of claim 17, said probe pin defining a longitudinal axis and said apparatus further comprising a resilient cardanic joint for connecting said probe pin to said support to permit said probe pin to deflect in a direction perpendicular to said longitudinal axis.

24. The coordinate measuring apparatus of claim 17, said operating handle being a half ring or a ring at least partially surrounding said probe pin and said interface being a flexible connection between said ring and said support.

25. A method for measuring a geometric element of a workpiece in a measuring operation with a manually guided coordinate measuring apparatus including a probe, a supporting mechanism for the probe to permit movement of the probe in several spatial directions, the probe having a probe pin having a probe element such as a probe ball thereon, a first plurality of sensors for continuously measuring the respective movements in said spatial directions for generating movement signals ($\phi$, $\psi$, z) indicative of said movements throughout the measuring operation; a plurality of sensing devices for continuously measuring deflections of said probe pin relative to said supporting mechanism and for generating deflection signals (u, v, w) indicative of said deflections throughout the measuring operation; the method comprising the steps of:

bringing said probe element into contact with said geometric element;

computing coordinate measured values from at least one of said movement and deflection signals ($\phi$, $\psi$, z, u, v, w); and,     deriving control signals from said coordinate measured values which characterize the start and end of a measurement operation on the geometric element of the workpiece.

26. The method of claim 25, further comprising computing the departures of said coordinate measured values from the ideal contours of the geometric elements and displaying said departures.

27. The method of claim 26, wherein, after said probe element is brought into contact with said workpiece, said probe element is manually guided along said workpiece thereby maintaining said probe element in continuous contact with said workpiece.

28. A manually guided coordinate measuring apparatus for measuring a workpiece in a measuring operation, the apparatus comprising:

a supporting mechanism to permit the movement thereof in three spatial directions;

a plurality of sensors for continuously measuring the respective movements in said spatial directions and for generating movement signals ($\phi$, $\psi$, z) indicative of said movements throughout the measuring operation;

a probe pin mounted on said supporting mechanism and being deflectable in at least two deflection directions;

a plurality of sensing devices for continuously measuring the deflections of said probe pin and for generating deflection signals (u, v, w) indicative of said deflections throughout the measuring operation;

an arrangement for processing at least one of said movement and deflection signals ($\phi$, $\psi$, z, u, v, w) to generate control signals characterizing start and end of a measurement operation on said workpiece;

a memory coupled to said arrangement for storing coordinate measured values obtained throughout said measuring operation and corresponding to said movement signals ($\phi$, $\psi$, z) and said deflection signals (u, v, w); and,     a support connected to said supporting mechanism and being provided to hold said probe pin; an operating handle mounted on said support; and, an interface between said support, on the one hand, and said operating handle, on the other hand, for force decoupling said operating handle from said support with respect to at least one degree of movement.

29. The coordinate measuring apparatus of claim 28, said operating handle being a half ring or a ring at least partially surrounding said probe pin and said interface being a flexible connection between said ring and said support.

\* \* \* \* \*

UNITED STATES PATENT AND TRADEMARK OFFICE
CERTIFICATE OF CORRECTION

PATENT NO. : 5,724,745
DATED : March 10, 1998
INVENTOR(S) : Kurt Brenner, Karl Seitz, Klaus Herzog and Werner Lotze It is certified that error appears in the above-identified patent and that said Letters Patent is hereby corrected as shown below:

On the title page, [54]: delete "GUIDE" and substitute -- GUIDED -- therefor

In column 1, line 1: delete "GUIDE" and substitute -- GUIDED -- therefor.

In column 6, line 5: delete "of the articulate legs (9a, 9b)".

In column 6, line 6: between "deflection" and "of", insert -- of the articulate legs (9a, 9b) --.

In column 7, line 27: between "of" and "spring", insert -- the --.

In column 8, line 64: delete "workplace." and substitute -- workpiece -- therefor.

In column 10, line 47: delete "fox" and substitute -- for -- therefor.

In column 11, line 15: delete "workplace" and substitute -- workpiece -- therefor.

In column 12, line 26: delete "workplace;" and substitute -- workpiece; -- therefor.

UNITED STATES PATENT AND TRADEMARK OFFICE
CERTIFICATE OF CORRECTION

PATENT NO. : 5,724,745
DATED : March 10, 1998
INVENTOR(S) : Kurt Brenner, Karl Seitz, Klaus Herzog and Werner Lotze It is certified that error appears in the above-identified patent and that said Letters Patent is hereby corrected as shown below:

In column 12, line 43: delete "ice" and substitute -- coordinate -- therefor.

In column 13, line 38: delete "pine," and substitute -- pin, -- therefor.

Signed and Sealed this

Fifteenth Day of September, 1998

*Attest:*

BRUCE LEHMAN

*Attesting Officer*   Commissioner of Patents and Trademarks